(12) United States Patent
Puchalla

(10) Patent No.: US 8,881,889 B2
(45) Date of Patent: Nov. 11, 2014

(54) SEGMENT BODY FOR A CONVEYOR BELT SCRAPER

(75) Inventor: Adam Puchalla, Marl (DE)

(73) Assignee: Rema Tip Top AG, Poing (DE)

( * ) Notice: Subject to any disclaimer, the term of this patent is extended or adjusted under 35 U.S.C. 154(b) by 0 days.

(21) Appl. No.: 13/704,434

(22) PCT Filed: Jun. 27, 2011

(86) PCT No.: PCT/DE2011/001394
§ 371 (c)(1),
(2), (4) Date: Apr. 2, 2013

(87) PCT Pub. No.: WO2012/010141
PCT Pub. Date: Jan. 26, 2012

(65) Prior Publication Data
US 2013/0206546 A1     Aug. 15, 2013

(30) Foreign Application Priority Data
Jun. 28, 2010 (DE) .......................... 10 2010 030 620

(51) Int. Cl.
*B65G 45/12* (2006.01)
*B65G 45/16* (2006.01)

(52) U.S. Cl.
CPC ................ *B65G 45/12* (2013.01); *B65G 45/16* (2013.01)
USPC ......................................................... 198/499

(58) Field of Classification Search
CPC ................................. B65G 45/16; B65G 45/12
USPC .................................................. 198/497–499
See application file for complete search history.

(56) References Cited

U.S. PATENT DOCUMENTS

| 3,994,388 A | 11/1976 | Reiter |
| 5,197,587 A * | 3/1993 | Malmberg .................... 198/497 |
| 5,797,477 A | 8/1998 | Veenhof |

(Continued)

FOREIGN PATENT DOCUMENTS

| DE | G 93 12 877.0 U1 | 12/1993 |
| DE | 295 00 659.5 U1 | 4/1995 |

(Continued)

OTHER PUBLICATIONS

Nov. 25, 2011 International Search Report issued in International Application No. PCT/DE2011/001394.
Australian Patent Office, Office Action dated Jul. 29, 2014 in Australian Patent Application No. 2011282069.

*Primary Examiner* — Mark A Deuble
(74) *Attorney, Agent, or Firm* — Oliff PLC

(57) ABSTRACT

A conveyor belt scraper, in particular a segment body for a conveyor belt scraper. The segment body for a conveyor belt scraper includes a plate-shaped mounting element, which can be connected to a flat bearing profile of a segment carrier, a carrier section, wherein the carrier section is formed on a first end area of the mounting element by means of a supporting area and an underside of the carrier section forms a hollow body together with an opposite section of the mounting element so that the carrier section is resiliently supported on the mounting element by means of the supporting area in order to form a first damping mechanism; and wherein the carrier section has at least one insertion pocket on the underside of the carrier section, which insertion pocket is suitable for accommodating a spring element in order to form a second damping mechanism.

15 Claims, 7 Drawing Sheets

(56) References Cited

U.S. PATENT DOCUMENTS

| | | |
|---|---|---|
| 6,315,105 B1 | 11/2001 | Gibbs et al. |
| 6,401,911 B1 * | 6/2002 | Swinderman ................ 198/499 |
| 6,457,575 B2 * | 10/2002 | Swinderman ................ 198/499 |
| 6,619,469 B2 * | 9/2003 | Malmberg .................... 198/497 |
| 8,123,022 B2 * | 2/2012 | Mott et al. .................... 198/497 |
| 8,245,836 B2 * | 8/2012 | Kotze ........................... 198/499 |

FOREIGN PATENT DOCUMENTS

| | | | |
|---|---|---|---|
| EP | 1 020 379 A1 | 7/2000 | |
| JP | 63282017 A * | 11/1988 | ............ 198/499 |
| WO | WO 2010/029482 A1 | 3/2010 | |

* cited by examiner 80
81
82
83

80

SEGMENT BODY FOR A CONVEYOR BELT SCRAPER

The present invention relates to a conveyor belt scraper, in particular a segment body for a conveyor belt scraper which enables simple installation on the associated carrier and has high wear resistance.

A multitude of conveyor belt scrapers is known from the prior art. In particular, they serve to clean conveyor belts at the drum or in the lower run directly behind the drum on the route during operation. Here, the conveyor belt is cleaned mechanically, i.e., a scraper is pressed against the rotating conveyor belt whereby the adhering contaminations are separated off by the scraper and deflected to one side. During this, depending on the purpose of application or the magnitude of the press-on force required, different principles are used for providing the press-on force of the scraper on the conveyor belt.

For example, a plurality of flexible scraping elements is often used across the width of the conveyor belt which are vertically moved so far during installation in the direction of the conveyor belt that they are flexibly deformed and thus apply a press-on force to the conveyor belt. However, the scraping elements have to be mounted to a plurality of locations on the carrier of the conveyor belt scraper in a very laborious manner and the carrier requires a special expensive construction which increases manufacturing costs.

In order to facilitate the installation of the scrapers, document DE 9312877U1, for example, discloses a specially formed support strip including insert pockets for accommodating the scraper elements and a protective strip on the opposite side more easily. Furthermore, the scraper elements themselves run upwards in a curve from the support strip in order to provide the scraper with a spring element. Moreover, the scraper is provided with an embedded spring plate to increase elasticity.

However, it is a disadvantage of this conveyor belt scraper that it requires specially manufactured support strips. Furthermore, during operation the scraper elements are consistently overloaded because e.g. a conveyor belt connection or damage to the conveyor belt affects the scraper elements for a short time. This may lead to the scraper elements being twisted in a pulsed manner or yielding jerkily which in turn increases the wear of the scraper elements and reduces operating life.

Therefore, it is an object of the present invention to provide an improved segment body for conveyor belt scrapers which has higher wear resistance and a simplified structure. It is another object of the invention to provide an improved segment body which enables a simpler installation on the segment carrier while the structure of the segment carrier used is simplified.

This object is obtained by the subject-matters according to the features of claim 1. Advantageous embodiments and preferred exemplary embodiments of the invention are stated in the dependent claims.

According to the invention, the segment body for a conveyor belt scraper according to the present invention comprises a plate-shaped mounting element that can be connected to a flat bearing profile of a segment carrier. Segment carriers e.g. are square steel beams having an I-profile (so-called double T beams) that can accommodate a plurality of segment bodies along the longitudinal axis thereof. A plate-shaped element in the sense of the present invention refers to a plane component, i.e. which has a low height in comparison to the length and width, the component having at least one flat lower bearing surface.

Furthermore, the segment body comprises a carrier section, the carrier section being formed on a first end area of the mounting element by means of a supporting area. A belt scraper element may be fixed to the supporting area or the supporting area itself may be formed as a scraper due to its shape. Furthermore, an underside of the carrier section forms a hollow body together with an opposite section of the mounting element so that the carrier section is resiliently supported on the mounting element by means of the supporting area and thus forms a first damping mechanism. This underside of the carrier section may adjoin the supporting area. Preferably, the formed hollow body has a U-shaped or parable-shaped cross-section. The hollow body may also have another cross-section, depending on the shape and surface texture of the boundary surfaces of the carrier section, the supporting area and the mounting element, which form the hollow body.

Therefore, the segment body has a recess between the lower mounting section thereof and an upper carrier section. The carrier section thus resiliently supported and disposed by means of the mounting element can carry out a rocking or resilient movement in the direction of the mounting element with the supporting area as a rocking or resilient axis in order to thereby dampen short-term or jerky overloads or impacts by the conveyor band. Here, the supporting area transmits the loads of the conveyor band to the mounting element which is fixed to the segment carrier in a supportive manner.

Furthermore, the carrier section has at least one insertion pocket on the underside of the carrier section, i.e. the underside adjoining the hollow body, which insertion pocket is suitable to accommodate a spring element in order to form a second damping mechanism. Thus, the segment body according to the invention has a double damping mechanism in order to effectively dampen short-term load peaks, impacts and jerky transmissions of force to the segment body, thus reducing the wear of the segment body and increasing the operating life thereof. Here, the constructions of both damping mechanisms show different solutions, on the one hand by creating a hollow body so that the carrier section is formed on the mounting element by means of a defined supporting area and at the same time is resiliently supported by means of this supporting area, and on the other hand by providing an insertion pocket which is suitable to accommodate a spring element that ends substantially vertically in the hollow body and bears on the mounting element.

Furthermore, as the spring element, the segment body may comprise a steel spring replaceably inserted into the insertion pocket, which bears on the opposite section of the mounting element. At this location, the mounting element may have a notch which is dimensioned such that it can accommodate the steel spring in a slip-proof manner. Using the steel spring mounted in the insertion pocket, it is possible to adapt the damping strength at will beyond the strength of the steel spring. In addition, jerky impacts or short-term overloads are predominantly absorbed by the replaceable wear part so that the material of the segment body is spared and the operating life thereof is increased. This second damping mechanism enhances the first damping mechanism, but at the same time has the advantage that the strength of the spring element to be accommodated in the insertion pocket varies depending on need and may be adapted to changed operating conditions so that the total strength of the damping mechanism is adjustable.

In addition thereto, the two damping mechanisms represent a particularly powerful energy storage by means of which the introduced pre-tensioning force can be stored in the first and second damping mechanisms and in use be re-introduced into the scraper and thus into the direction of the conveyor belt as press-on force in a quasi-reversible manner to secure high cleaning force. Apart from the damping function, the inventive double damping mechanism thus enables simple and variable adjustment of the press-on force by means of selecting a suitable strength or dimensioning of the inserted spring elements.

Moreover, the spring element to be inserted into the insertion pocket represents a wear element that can be replaced at regular intervals so that only a comparatively low-priced component such as the spring element needs to be replaced in case of wear whereas the segment body can continue to be used.

The insertion pocket is preferably located at a second end area of the mounting element, which is opposite the first end area and thus the supporting area in order to enable a lever as long as possible for aiding the damping movement of the first spring element.

Two insertion pockets may be attached to the adjoining underside of the carrier section in order to accommodate a respective spring element there because this leads to a particularly favorable uniform distribution of pressure and impact dampening. There may also be disposed three insertion pockets side by side in order to enhance the damping mechanism by using three springs.

Furthermore, the segment body of the present invention may be connected to the segment carrier in a form-fitting and/or force-fitting manner. Thus, system bores may be attached to a second end area of the mounting element, which is opposite the first end area, in order to force-fittingly connect the mounting element to the flat bearing profile of a segment carrier. These system bores are equally spaced apart like the corresponding system bores of the segment carrier, for example, of the steel beam, so that the mounting element can be force-fittingly connected to the steel beam by using a fastener, such as, for example, a screw.

Furthermore, a first end area of the mounting element has a formed U-shaped connecting element which is suitable to form-fittingly connect the mounting element to an edge of the flat bearing profile of the segment carrier. This is particularly advantageous in order to put down the segment body, which often weighs several kilograms, on the segment carrier by using the plate-shaped mounting plate in a first step and subsequently position and secure it by means of the U-shaped connecting element. Then, the system bores of the mounting plate can be brought into an overlapping position with the system bores of the segment carrier in a fine adjustment in order to force-fittingly connect the segment body to the segment carrier by using further fasteners.

The plate-shaped bottom plate in combination with the inventive form-fitting and/or force-fitting connecting areas of the bottom plate makes it possible to have the segment body mounted to the segment carrier by one worker only while two workers were needed for the fastening mechanisms known from the prior art, for example based on cylinder-shaped supporting ledges, in order to install and at the same time secure the segment body to the segment carrier. The plate-shaped bottom plate in combination with the form-fitting and/or force-fitting fastening possibilities further enables the fastening of the segment body to conventional steel beams that have particularly high support stability when accommodating a plurality of segment bodies and moreover can be produced in large numbers and thus purchased at low costs.

Furthermore, the segment body may have a recess in the supporting area. For example, the recess may be located between the hollow body and an outer surface of the carrier section which is on the side of the first end area of the mounting element. The inventors of the present invention determined in elaborate experimental series that a recess thus placed advantageously improves the elasticity and damping characteristics of the segment body and thus results in less overall wear. It is particularly preferred when the recess is substantially parallel to a summit line of the hollow body having a U-shaped or parable-shaped cross-section. In other words, the recess is disposed between the hollow body and the outer surface of the segment body. The recess may e.g. be a to tunnel-shaped hole therethrough along the width of the supporting area.

It is of particular advantage for the stability and damping characteristics of the segment body if the latter is formed as an integral component. The segment body may be made of a flexible synthetic material, for example, polyurethane. Preferably, the segment body together with the mounting element, the supporting area, and the carrier section consists of a homogeneous material.

Furthermore, the carrier section may at the same time be formed as a scraper and thus as a wear element. In this case the carrier section may be formed as a tapering body having a concavely curved outer surface and a convexly curved outer surface opposite thereto, wherein the concavely curved outer surface is disposed above the first end area and the convexly curved outer surface is disposed above the second end area of the mounting element. Moreover, the concavely curved and the convexly curved outer surfaces may end in an inclined or chamfered outer surface which is then positioned at the surface of the conveyor drum and pressed thereon as a contact surface. The tapering curved shape of the scraper makes it possible to particularly advantageously distribute the impact forces transmitted by the belt and to exactly position the scraper on the conveyor belt.

Furthermore, the carrier section may be formed in two pieces including a first lower carrier section connected to the mounting plate by means of the supporting area and a replaceably fixed upper scraper element as a wear part. The upper section of the carrier section is exposed to particularly high wear due to the contact with the conveyor band. A two-part formation of the carrier section including an upper wear part that is replaceably fixed to the lower section of the carrier section makes it possible to replace only the worn upper section and to re-use the lower section which is not worn.

The carrier section may comprise an accommodating area for the application of force of at least one wear element. For example, a scraper rod may be attached in this accommodating area, wherein a spatula is formed in the area of one longitudinal end of the scraper rod which spatula can be positioned as a scraper on the surface of the conveyor belt. To this end, a thread may be cast in the carrier section, for example, in which the scraper rod can be fixed above the accommodating area. In other words, it is not the carrier section itself that is formed as a scraper but it serves as an accommodating carrier for a replaceably fixed scraper. This is particularly advantageous for the use as a segment body in the lower run of the conveyor belt. In addition, an is increase of the press-on force can be realized by selecting the lengths of the levers between the accommodating area and the scraper.

In order to further improve the stability of the segment body a steel plate may be embedded in the mounting section. Preferably, this steel plate is a perforated plate.

Furthermore, according to the present invention, a conveyor belt scraper can be formed by attaching a group of segment bodies to a steel beam which each have at least one spring element in the insertion pocket and are juxtaposed on the steel beam along its longitudinal axis, wherein centrally disposed segment bodies have spring elements of a higher spring strength in the insertion pockets than segment bodies which are arranged on the outside. This arrangement is particularly advantageous for increasing the overall operating life of the conveyor belt scraper. The inventors of the present invention found that the signs of wear of a conveyor belt scraper containing a plurality of scrapers are particularly high around the center of the belt and there lead to an increased abrasion of the scrapers. The present invention allows to individually set the damping characteristics of the scrapers and thus to optimally adapt them to the load distribution by the conveyor belt in order to thereby reduce the wear of the material and improve the operating life of the scrapers.

In summary, the present invention enables a segment body for a conveyor belt scraper or a scraper which due to its compact and simple structure enables particularly simple and fast installation on a common steel beam and additionally has two different damping mechanisms that support each other, wherein one damping mechanism is formed as a wear element by means of a replaceably insertable spring element. Thus, jerky impacts, blows and short-term loads in particular can be reliably dampened in order to reduce material wear. Furthermore, it is possible to store the applied pre-tensioning force in the double spring element and in operation re-introduce it quasi-reversibly into the scraper and thus in the direction of the conveyor belt as press-on force. Worn spring elements in the insertion pockets can be replaced simply and quickly so that the segment body accommodating the spring elements can be reused. The simple overall structure of the segment body makes it possible to produce the latter as an integral component by using common plastic molding methods. The inventive segment body permits the use both as a scraper on the conveyor drum and as a scraper on the lower run.

Preferred embodiments and further details of the present invention are exemplarily described in more detail below with reference to the accompanying schematic drawings.

Figure 1:
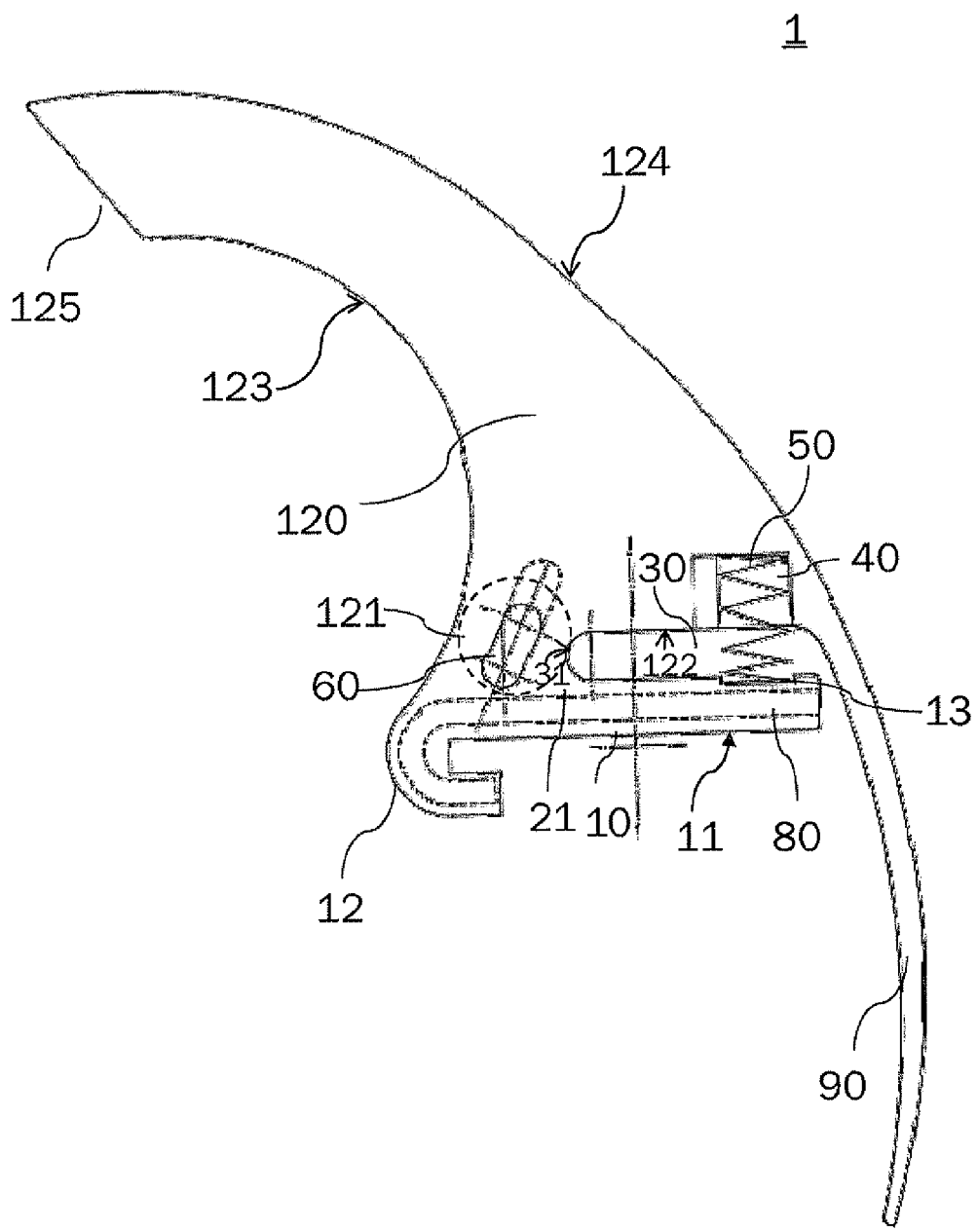
FIG. 1 shows a side view of a segment body according to an embodiment of the present invention.

FIG. 1 shows a side view of a segment body according to an embodiment of the present invention. The segment body 1 has a plate-shaped mounting element 10 at its lower end, which can be connected to a flat bearing profile of a segment carrier (not shown). The dimensions of the mounting element 10 are adapted to the flat bearing surface of the segment carrier used, for example a double-T steel beam. A U-shaped connecting element 12 is disposed at the left end of the mounting element 10, which may form-fittingly reach around an edge of the flat bearing profile of a segment carrier (not shown) in order to position the segment body on and secure it to the segment carrier in a first step when the former is installed.

Furthermore, the segment body 1 comprises a carrier section 120 formed on a first end area of the mounting element 10 by means of a supporting area 121. The supporting area is illustrated by means of the dashed circle line in FIG. 1. Here, an underside 122, which adjoins the supporting area 121, of the carrier section 120 forms a hollow body 30 together with an opposite section of the mounting element 10, which hollow body 30 forms a U-shaped or parable-shaped cross-section so that the carrier section 120 is resiliently supported on the mounting element 10 by means of the supporting area 121 in order to form a first damping mechanism which at the same time effects a press-on force on the conveyor belt surface to be cleaned.

The segment body 1 in FIG. 1 is integrally molded from polyurethane, a flexible synthetic material. The carrier section 120 has two insertion pockets 40 on the adjoining underside 122 of the carrier section 120, with only the front insertion pocket 40 being shown in FIG. 1. The insertion pocket contains a steel spring 50 which is replaceably inserted at this location in order to form a second damping mechanism. This second damping mechanism supports the first damping mechanism formed by the hollow body 30 and the supporting area 121. The steel spring 50 is substantially borne vertically on the bottom plate 10. The bottom plate 10 has a circular accommodation 13 for respectively accommodating the steel springs 50 in order to accommodate the steel spring 50 at this location in a slip-proof manner.

The carrier section 120 is formed as a tapering scraper including a concavely curved outer surface 123 and a convexly curved outer surface 124 opposite thereto, the concavely curved outer surface 123 being disposed above the first end area and the convexly curved outer surface 124 being disposed above the second end area of the mounting element 10. The concavely 123 and convexly 124 curved outer surfaces end in an upper chamfered edge 125 which is positioned on the surface of the conveyor belt (not shown) in order to scrape contaminations from the conveyor belt there.

Blows or jerky overloads acting on the scraper in FIG. 1 lead to a resilient or rocking movement of the carrier section 120 about a rocking axis perpendicular to the drawing plane, which passes through the supporting area 121. This rocking movement is additionally dampened by the spring element 50. By using this double damping mechanism it is possible to reliably absorb short-term overloads by means of the damping mechanisms in order to spare the material of the segment body 1.

Moreover, the supporting area 121 contains a recess 60 which increases the flexibility of movement of the segment body 1 during damping movements and thus improves the efficiency of the damping mechanism. The dashed line suggests that different sizes for the recess 60 can be realized during manufacture in order to adapt the flexibility to various operating conditions.

A protective flap 90 is formed on the side of the insertion pockets at the lower longitudinal side of the segment body 1, which flap protects the mounting plate and the damping mechanism against contaminations. The width of the protective flap 90 at least corresponds to the width of the segment body 1 in order to protect the entire width of the mounting body against contaminations.

Figure 4A:
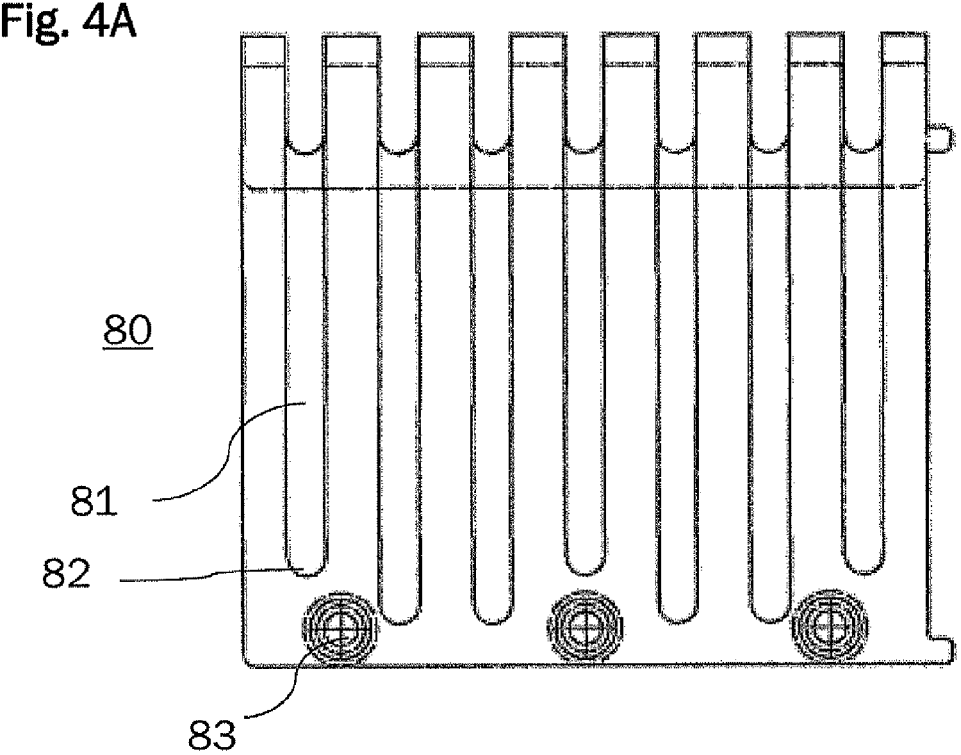
FIG. 4A shows a top view of a steel plate which is embedded in a bottom element of a segment body according to an embodiment of the present invention.
Figure 4B:
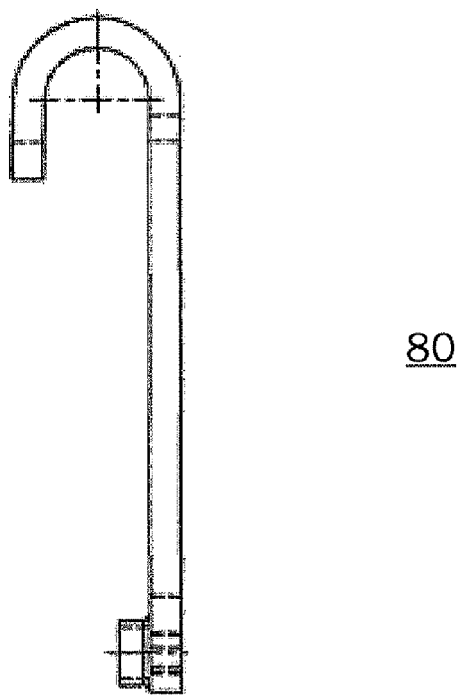
FIG. 4B shows a side view of the steel plate of FIG. 4A.

A steel plate 80 is embedded in the mounting element 10, which is also formed in a U-shape at the left end area and extends in the connecting element 12. The steel plate 80 acts as a stabilizer against twisting. FIG. 4A shows a top view of the steel plate 80. The steel plate 80 is a perforated plate 80 containing longitudinal holes 81 arranged in parallel and having rounded corners 82. Furthermore, the steel plate 80 has system bores 83 which are spaced apart in accordance with the system bores on the steel beam and the system bores of the segment carrier 1 in order to form-fittingly connect the segment carrier 1 to the steel beam 100. The U-shaped end area is clearly visibly illustrated in the side view of FIG. 4B.

Figure 2:
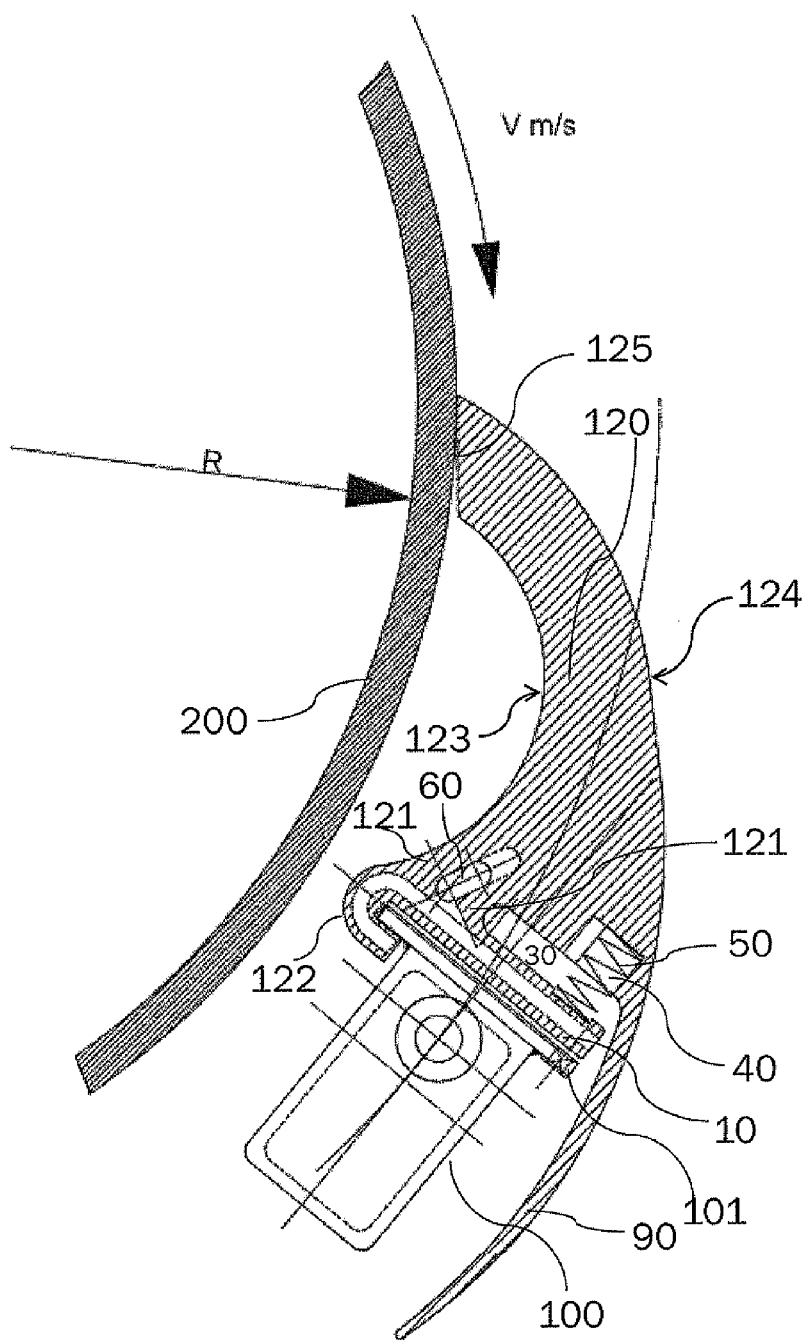
FIG. 2 shows a side view of the segment body of FIG. 1 and schematically illustrates the use of the segment body on the drum of a conveyor belt system.

FIG. 2 shows a side view of the segment body of FIG. 1 and schematically illustrates the use of the segment body 1 at the drum 200 of a conveyor belt system. The drum 200 moves clockwise with a speed v. FIG. 2 in particular shows the segment body 120 in a mounted state on a square steel beam 100 having a T-profile with an upper edge-shaped bearing plate 101 on which the segment body 1 is connected to the U-shaped connecting element 12 in a form-fitting manner on the left side and by means of screws in a force-fitting manner on the right side. A conveyor belt scraper consists of a plurality of segment bodies 1 which are juxtaposed on the steel beam 100 in a uniformly spaced-apart fashion, depending on the width of the drum 200 of the conveyor band (not shown). The upper scraper edge 125 is positioned on the drum 200 such as to be able to efficiently separate off contaminations present thereon. Thus, in addition to the damping function the two damping mechanisms also ensure suitable press-on pressure of the segment body to the drum 200 or the conveyor band (cf. FIG. 6). A corresponding positioning of the segment bodies mounted to the segment carrier 100 at the drum 200 or the conveyor band 300 (cf. FIG. 6) results in a press-on force which generates a return force due to the flow of force within the segment body, which return force is applied by the first and second damping mechanisms. Due to the return force set the wear element 120 always moves in the direction of the drum 200 so that the cleaning thereof is always ensured in spite of wear.

Figure 3:
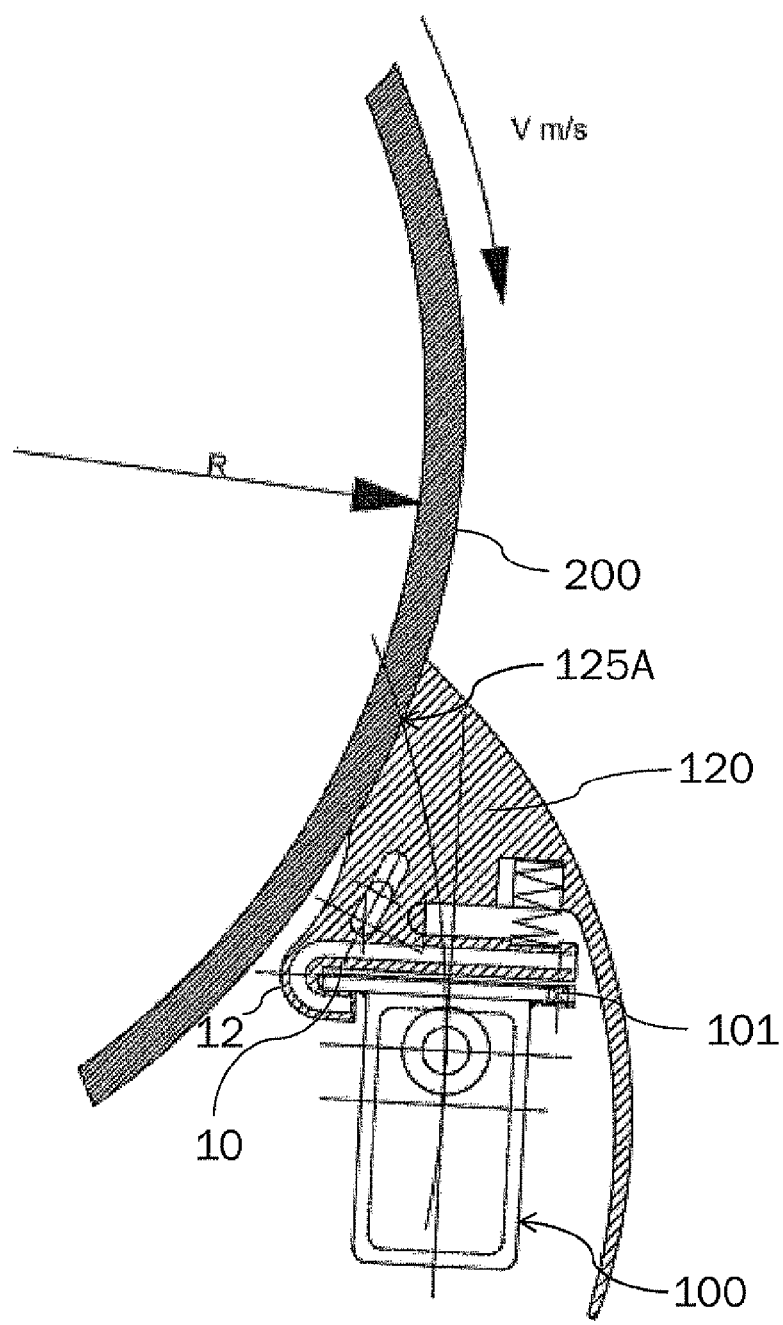
FIG. 3 shows a side view of the segment body according to FIG. 2 in a more worn state.

FIG. 3 shows a side view of the segment body according to FIG. 2 in a more worn-out state in which the upper section of the carrier section 120, particularly the upper edge 125, is already strongly abraded. The wear element 120 is now in contact with the drum 200 via a contact surface 125A, the friction force being increased as compared to the state of FIG. 2. FIG. 3 shows that the double damping mechanism of the inventive scraper enables effective damping and press-on force even in a worn-out state. Due to the return force set the wear element 120 always moves in the direction of the drum 200 so that the cleaning thereof is ensure in spite of wear.

Figure 5:
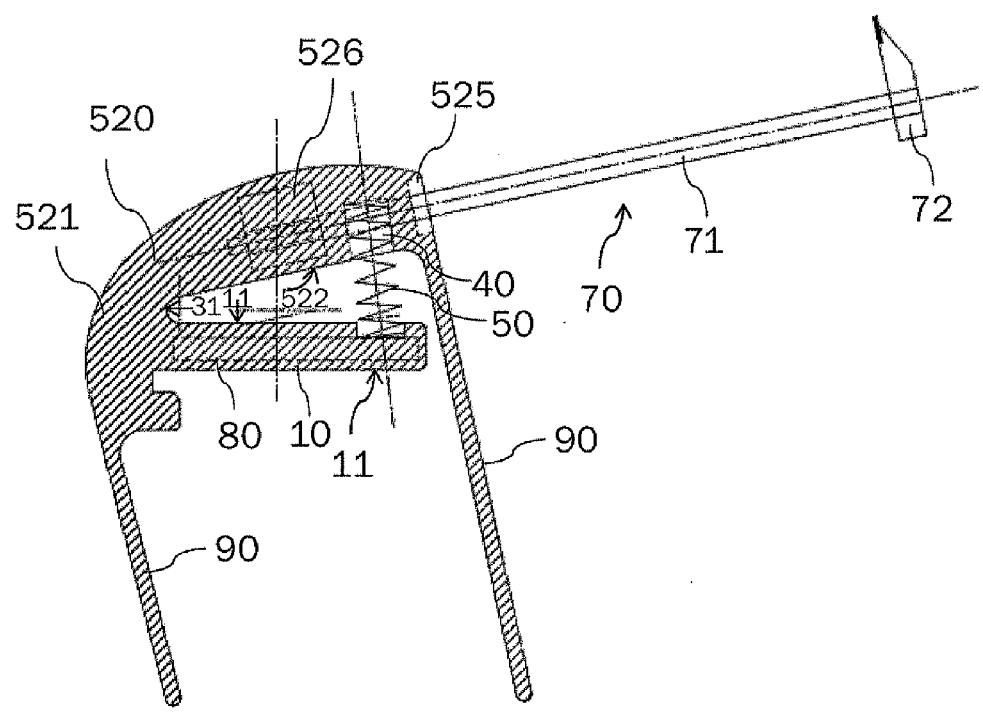
FIG. 5 shows a side view of a segment body according to another embodiment of the present invention.

Referring to FIG. 5, a side view of a segment body according to another embodiment of the present invention is shown. The segment body 5 substantially differs from the segment body 1 of FIG. 1 in that the carrier section 520 is not formed as a scraper but comprises an accommodating area 525 for applying force of at least one wear element 70. The wear element 70 is formed as a scraper rod 71 on the longitudinal end of which a spatula 72 is formed. Furthermore, the scraper rod 71 is mounted such in the accommodating area 525 that the scraper rod 71 cannot carry out any movement along the longitudinal direction. Moreover, the scraper rod 71 is connected to spatula holder 526 in a rotationally fixed manner, which holder is realized, for example, as a screw thread molded in the carrier element 520. The spatula 72 is formed of a hardened steel material. The side view of FIG. 5 only shows the front steel spring 50. The scraper 5 has two steel springs 50 of identical structure which are inserted in parallel in adjacent pockets 40. The explanations on the effect of the segment body 5, in particular of the two damping mechanism, apply in accordance with the above-described explanations.

FIG. 5 shows further how the accommodating area 525 and the scraper rod 71 in an unloaded state are inclined at an angle relative to the horizontal. In a preferred embodiment, the angle is between 10 and 45°. Another difference from the segment body of FIG. 1 is that the segment body 5 has protective flaps 90 attached on both sides. Furthermore, the steel plate 80 in a left end area does not extend in a U-shape, as in FIG. 1, but is only located in the plate-shaped area of the mounting plate 10. Moreover, the steel spring 50 located in the insertion pocket 40 does not extend exactly vertically to the bottom plate in a non-tensioned state.

Figure 6:
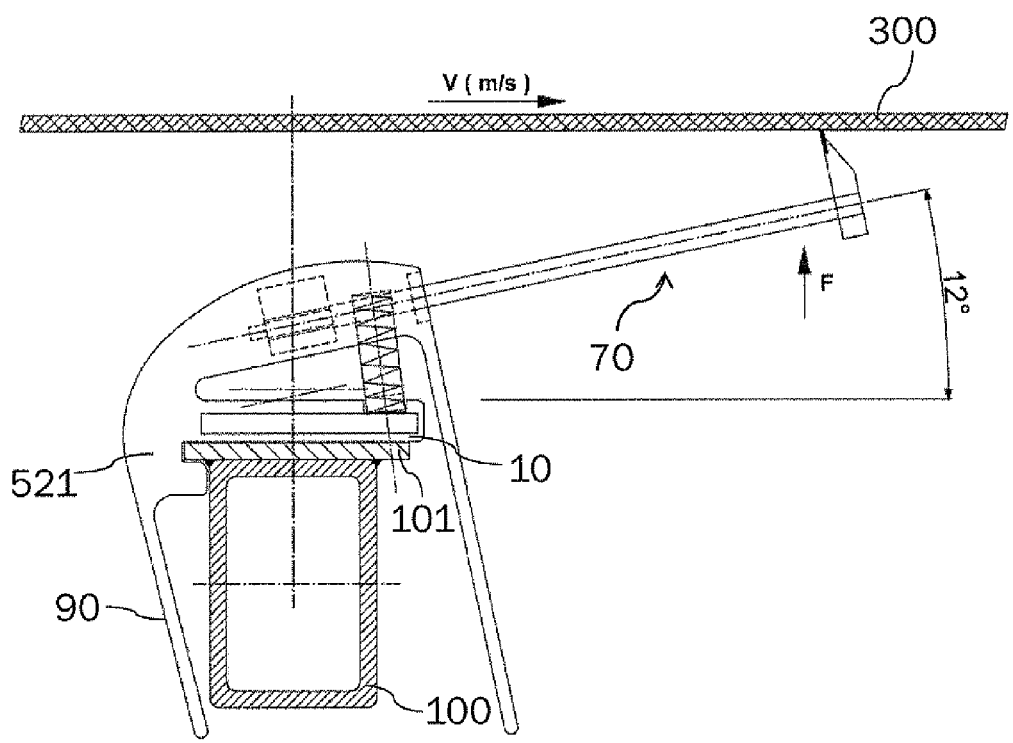
FIG. 6 shows a side view of a segment body of FIG. 5 when used on the lower run in a non-tensioned state.

FIG. 6 shows a side view of the segment body 5 of FIG. 5 when used in the lower run in a non-tensioned state. In order to apply a press-on pressure of the spatula 72 to the conveyor belt 300 the steel beam 100 including the scrapers 5 mounted thereto is vertically moved in the direction of the conveyor belt.

Figure 7:
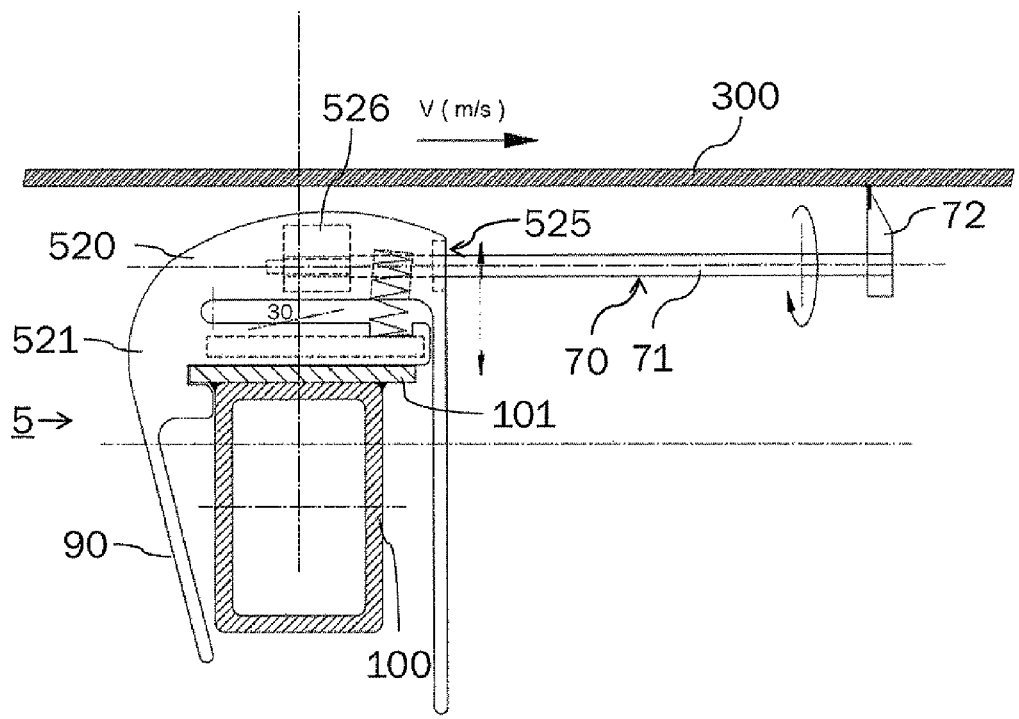
FIG. 7 shows a side view of a segment body of FIG. 5 when used on the lower run in a tensioned state.

FIG. 7 shows a side view of the segment body 5 of the invention including the scraper rod 71 and the spatula 72 according to FIG. 5 in a tensioned state after the steel beam 100 with the installed segment body 5 has been vertically moved in the lower run in the direction of the conveyor band belt 300 so that the scraper rod 71 in the tensioned operating position as shown is in a substantially horizontal position. An inclined position during a further displacement of the conveyor belt scraper in the direction of the conveyor band belt 300 is also possible. In this tensioned position the spring element 50 located in the insertion pockets 40 is in a position which is substantially perpendicular to the bottom plate 20 and the bearing surface 101 of the segment carrier. As soon as the spatula 72 is in contact with the conveyor belt 300 a reaction force is introduced into the spring element 50 and the first damping mechanism by means of the holding area 525 of the segment body 5 and stored therein.

Of course, the individual features of the invention are not limited to the described combinations of features in the scope of the predetermined embodiments and may also be used in other combinations depending on given device parameters.

The invention claimed is:

1. A segment body for a conveyor belt scraper, comprising:
a plate-shaped mounting element, which can be connected to a flat bearing profile of a segment carrier; and
a carrier section, wherein the carrier section is formed on a first end area of the mounting element by means of a supporting area and an underside of the carrier section forms a hollow body together with an opposite section of the mounting element so that the carrier section is resiliently supported on the mounting element by means of the supporting area in order to form a first damping mechanism,
wherein the carrier section has at least one insertion pocket on the underside of the carrier section, which insertion pocket is suitable for accommodating a spring element in order to form a second damping mechanism, and
wherein at the first end area of the mounting element a U-shaped connecting element is formed which is suitable for form-fittingly connecting the mounting element to an edge of the flat bearing profile of the segment carrier.

2. The segment body according to claim 1, wherein a second end area of the mounting element, which is opposite to the first end area, has system bores in order to force-fittingly connect the mounting element to the flat bearing profile of a segment carrier.

3. The segment body according to claim 1, wherein the supporting area has a recess.

4. The segment body according to claim 3, wherein the recess is disposed between the hollow body and an outer surface of the carrier section resting on the side of the first end area of the mounting element.

5. The segment body according to claim 3, wherein the recess is substantially parallel to a summit line of the hollow body having a U-shaped or parabola-shaped cross-section.

6. The segment body according to claim 1, wherein the segment body is an integral component.

7. The segment body according to claim 1, further comprising a steel spring replaceably inserted in the insertion pocket that bears on an opposite section of the mounting element, and wherein the mounting element has a notch at the opposite section which is dimensioned so as to accommodate the steel spring in a slip-proof manner.

8. The segment body according to claim 1, wherein the segment body is made of a flexible synthetic material.

9. The segment body according to claim 1, wherein the carrier section is formed as a tapering scraper including a concavely curved and a convexly curved outer surface opposite thereto, the concavely curved outer surface being disposed above the first end area and the convexly curved outer surface being disposed above the second end area of the mounting element.

10. The segment body according to claim 9, wherein the carrier section is formed in two parts, including a first lower carrier section connected to the mounting element and a replaceably fixed scraper element.

11. The segment body according to claim 1, wherein the carrier section comprises a holding area for applying force of at least one wear element.

12. The segment body according to claim 11, further comprising a scraper rod fixed in the holding area, a spatula being formed in an area of one longitudinal end of the scraper rod.

13. The segment body according to claim 1, further comprising a steel plate embedded in the mounting section.

14. The segment body according to claim 1, wherein the hollow body has a U-shaped or parabola-shaped cross-section.

15. A conveyor belt scraper comprising a steel beam and a group of segment bodies according to claim 1, wherein the segment bodies each have at least one spring element in the insertion pocket and are juxtaposed on the steel beam along a longitudinal axis thereof, with centrally disposed segment bodies having spring elements of higher spring strength than segment bodies which are disposed outside of the centrally disposed segment bodies.

* * * * *